March 14, 1933.  C. FORBERG  1,901,391
COMBINATION WASHER
Filed March 8, 1932
Fig. 1.
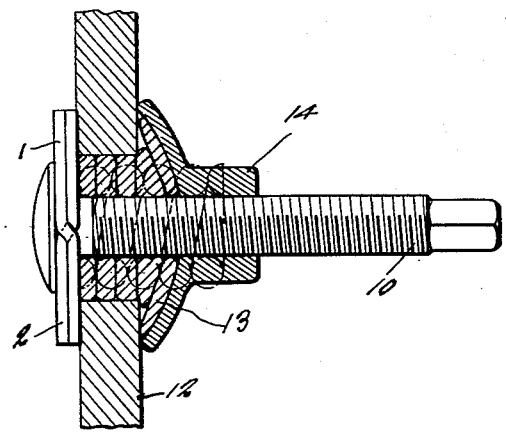
Fig. 2.
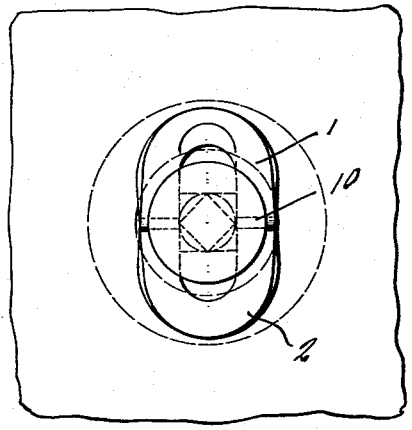
Fig. 3.
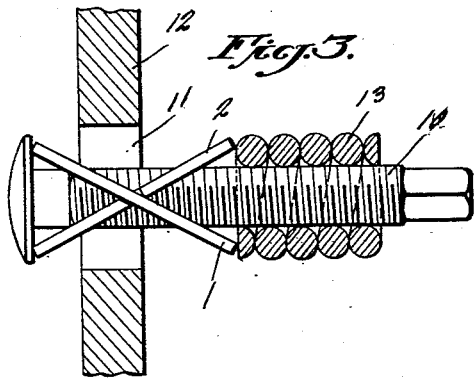
Fig. 4.
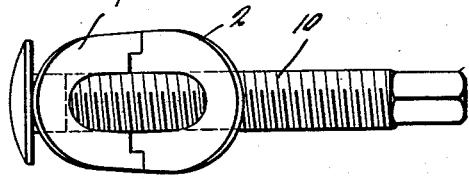
Fig. 6. Fig. 5.
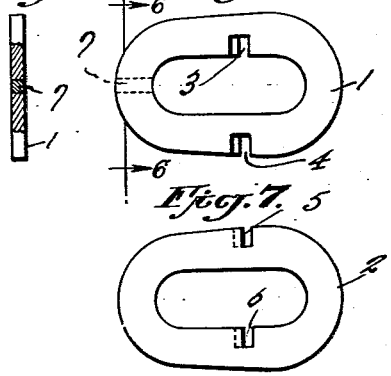
Fig. 8. Fig. 9.
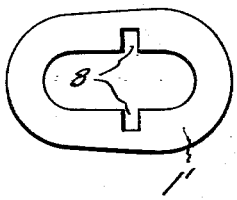 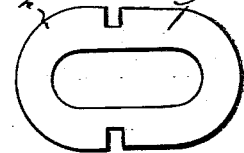
Fig. 7.
Inventor
CHRISTIAN FORBERG.
By Clarence A. O'Brien
Attorney Patented Mar. 14, 1933

1,901,391

UNITED STATES PATENT OFFICE

CHRISTIAN FORBERG, OF ST. THOMAS, ONTARIO, CANADA

COMBINATION WASHER

Application filed March 8, 1932. Serial No. 597,578.

This invention relates to a combination washer, the general object of the invention being to provide means whereby the washer can be placed through a hole in a member together with the head of a bolt and the parts manipulated from that side of the washer opposite to the side to be engaged by the bolt head and washer, so that the washer will bridge the hole and support the head of the bolt or the washer can wedge itself in the hole.

Another object of the invention is to provide means whereby a water-tight as well as an air or fluid tight joint can be made at the holes or openings.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawing wherein like references denote like or corresponding parts throughout the several views, and in which:—

Figure 1 is a sectional view showing the invention in use to provide a fluid-tight joint between the washer and a nut and the opening through which the bolt passes.

Fig. 2 is a view looking toward the head and washer of Fig. 1.

Fig. 3 is a view showing the position of the parts before the nut is applied to the bolt.

Fig. 4 is a top plan view of the bolt and the washer shown in Fig. 3.

Fig. 5 is a view of one part of the washer.

Fig. 6 is a section on line 6—6 of Fig. 5.

Fig. 7 is a view of the other part of the washer.

Figs. 8 and 9 show a slight modification form of washer.

As shown in this drawing the washer is composed of the two parts 1 and 2, each part being made in the form of a closed link with part 1 having a notch 3 in one of its inner side walls and a notch 4 in the exterior wall of the opposite side. The part 2 is formed with a notch 5 in the exterior of one of its side portions and a notch 6 in the interior wall of the opposite side portion. One side wall of each notch is beveled as shown in Figs. 5 and 7, and in order to permit the part 2 to be placed in the part 1, with the notch 5 engaging the notch 3, and the notch 6 engaging the notch 4, I split the part 1 as shown at 7 in Figs. 5 and 6, and then after the side containing the notch 5 is placed in the part 1, the split 7 is welded as shown in Figs. 5 and 6.

Figs. 8 and 9 show a slight modification in which the notches 8 of the part 1' are placed in the interior walls of the side parts and the part 2' has exterior notches 9 which engage the notches 8 as shown in Fig. 4. The part 2' is bent and placed in part 1' and then straightened.

The two part washer is placed on the bolt 10 as shown in Figs. 3 and 4, and the head of the bolt passes through an opening 11 in the member 12 and then the washer is manipulated to cause the inner ends of the two parts to engage the member 12 after which pressure is applied to the bolt, by screwing a nut on its threaded part, so that the head of the bolt will exert pressure upon the two parts of the washer and cause them to bend slightly at the notched portions until the two parts rest one upon another, as shown in Fig. 1. Thus the washer will bridge the opening and support the head of the bolt as shown in Fig. 1 and also in Fig. 2.

If it is simply necessary to hold the bolt in this position, a washer and a nut can be threaded on the bolt to engage the inner face of the member 12, and of course the washer or the nut, if the nut is used, alone, will hold the combination washer bridging the opening. However, Fig. 1 shows packing means used to make a fluid-tight joint between the parts and such means may consist of a spirally wrapped packing member 13, as shown in Fig. 3, which is wrapped around the bolt so that when the flanged nut 14 is threaded on the bolt and tightened, the packing will depress and fill up the opening, and the space between the flange part of the nut and the plate 12 as shown in Fig. 1.

As before stated, this provides a fluid-tight joint between the parts. If desired, the two part washer can be placed in the opening and when collapsed will wedge itself in the opening, and a tubular packing can be used, if desired.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A washer of the class described comprising two parts having their central portions movably connected together whereby the two parts can be placed on a bolt or the like and diagonally positioned on the bolt to permit the washer to be passed through a hole, after which the two parts are placed one upon another to bridge the hole.

2. A washer of the class described comprising two members of loop-like shape with the sides elongated, and means for pivoting one part on the other part at substantially the centers of the side portions thereof.

3. A washer of the class described comprising two members each of elongated loop-like shape, one member having notches at substantially the central portion of its sides for receiving portions of the side parts of the other part for permitting rocking movement of one part on the other.

In testimony whereof I affix my signature.

CHRISTIAN FORBERG.